United States Patent [19]
Willis

[11] 3,945,084
[45] Mar. 23, 1976

[54] SCALLOP SPREADING DEVICE
[75] Inventor: Elmer D. Willis, Williston, N.C.
[73] Assignee: Willis Brothers, Inc., Williston, N.C.
[22] Filed: Feb. 13, 1973
[21] Appl. No.: 332,188

[52] U.S. Cl. .................................. 17/73; 17/53
[51] Int. Cl.² ............................... A22C 29/00
[58] Field of Search .............. 17/71, 48, 53, 54, 72, 17/73

[56] References Cited
UNITED STATES PATENTS

| | | | |
|---|---|---|---|
| 3,393,424 | 7/1968 | Welcker et al. | 17/72 |
| 3,621,515 | 11/1971 | Bunnell | 17/53 |
| 3,662,432 | 5/1972 | Wenstrom | 17/53 |
| 3,740,795 | 6/1973 | Cox | 17/53 X |
| 3,829,933 | 8/1974 | Lambert | 17/53 |

Primary Examiner—Warner H. Camp
Attorney, Agent, or Firm—Finnegan, Henderson, Farabow & Garrett

[57] ABSTRACT

A scallop spreading device is provided on a scallop eviscerator having rollers mounted on an eviscerator frame in an inclined path. The spreading device includes a travelling frame mounted on the eviscerator frame for reciprocating movement relative thereto and to the rollers. A plurality of spaced spreader bars are mounted on the travelling frame with the axes of the spreader bars being substantially parallel to the axes of the rollers. Drive means are provided to reciprocate the travelling frame in a plane aligned with the inclined path. Adjustment means are provided to vary the height of the spreader bars above the eviscerator rolls. The spreader bars force the scallops back up the inclined path to lengthen the time the scallops are subjected to the action of the eviscerator. The height adjustment permits the spreader bars to be adjusted according to the size of the particular scallop batch being processed.

9 Claims, 2 Drawing Figures

SCALLOP SPREADING DEVICE

BACKGROUND OF THE INVENTION

This invention relates to the processing of scallops, and more particularly relates to an apparatus for extracting the adductor muscle from scallops.

The preparation of scallops for human consumption involves shucking, the separation of the adductor muscle from the shells, and eviscerating, the separation of the adductor muscle from the viscera which clings to the periphery of the muscle. Although the viscera of scallops is usually considered to be edible, only the cylindrical adductor muscle is commonly sold for human consumption.

Apparatus for mechanically eviscerating scallops has been recently developed which has greatly diminished the problems encountered in mechanically eviscerating scallops. This apparatus is described in my U.S. Pat. No. 3,665,555 which is hereby incorporated by reference and comprises a plurality of counterrotating rollers which are arranged to form an inclined path that descends from the input end of the eviscerator. Each of the rollers has its axis aligned transversely of the path and is positioned so that the surface of each intermediately positioned roller forms a nip with the adjacent roller on its input side and a nip with the adjacent roller on its output side. Drive means oscillate the rollers so that the upper exposed portion of adjacent rollers are alternately rotated towards each other to pull viscera from the scallop muscles and through the nip of the rollers, and alternately rotated away from each other to permit the lower roller to advance the scallop down the inclined path. Cleaning means remove the viscera from the underside of the rollers.

This machine depends upon the rollers to perform the function of bringing the viscera to the nip of the rollers where the viscera can be pulled from the muscle. The size and spacing of the rollers determines the efficiency of the rollers in accomplishing this function of feeding the viscera to the nip of the rollers. The choice of roller size and spacing is to some extent a direct function of the diameter of the scallop muscle, although other factors such as muscle firmness also have an effect. Scallop muscles, for a single scallop species, vary in diameter due to such factors as seasonal spawning activity.

The problem of feeding viscera into the nips of the rollers is particularly serious when processing a variety of scallops known as sea or ocean scallops because these scallops can vary widely in diameter. A roller of a given diameter may efficiently feed scallops and attached viacera when the scallop muscle is a given diameter, and be very inefficient when processing scallop muscles of a significantly larger or smaller diameter.

Scallop muscles with attached viscera have been fed to roll eviscerators by an endless conveyor that drops the scallops onto the top portion of the bank of rollers. Such an arrangement tends to cause the scallops to bunch up and does not distribute the scallops uniformly across the length of the rollers. This uneven distribution lowers the efficiency of the eviscerator and makes it necessary to use more rollers than would be necessary if more uniform distribution of scallops could be attained.

Various attempts have been made to more efficiently present scallops having attached viscera to the nips of counterrotating roll eviscerators. These have included attempts by workers to manually distribute scallops across the top of the roller eviscerator and to manually push individual scallops into the nip of the rollers at the bottom of the eviscerator. Hand-manipulated, flexible members have also been used to push the scallops into the nip of the rollers. A means for feeding scallops into the nip of the rollers is disclosed in U.S. Pat. No. 3,621,515, however, this device performs only a limited lateral spreading function and may tend to accelerate the passage of scallops down the bed of rollers.

SUMMARY OF THE INVENTION

The present invention provides a scallop spreading device for use with a scallop eviscerator formed by a plurality of counterrotating rollers rotatably mounted on a frame to form an inclined path, with the axes of the rollers aligned transversely of the path. The spreading device of the present invention comprises a travelling frame mounted on the eviscerator frame for reciprocating movement relative to the eviscerating frame and the counterrotating rollers; a plurality of spaced spreader bars mounted on said travelling frame with the axes of the spreader bars being substantially parallel to the axes of the rollers; drive means connected to the travelling frame for reciprocating the travelling frame in a plane aligned with the inclined path; and adjustment means connected to the travelling frame for varying the height of the spreader bars above the eviscerator rollers.

The spreader bars force the scallops back up the inclined path to lengthen the time the scallops are subjected to the action of the eviscerator rollers and subject the scallops to a second eviscerating action. The spreader bars also turn the scallop meat to rotate the viscera to a position at the nip of the rollers. The spreader bars urge larger size scallops into the nip of the rollers so that the viscera can be effectively removed. The height adjustment means of the present invention enables the spreader bars to be adjusted according to the size of the particular scallop batch being processed. Thus, a single size roller can more efficiently process scalloped muscles of various diameters.

Preferably, the adjustment means of the present invention includes first adjusting means connecting each spreader bar with the travelling frame for individually adjusting the height of each spreader bar and second adjusting means connected to the travelling frame for adjusting the height of the travelling frame. It is also preferred that the first height adjusting means for each spreader bar comprise a plurality of brackets to which the spreader bar is secured, with each bracket having an elongated slot and being movable within the limits of the elongated slot to various heights, and means for securing the bracket to the travelling frame at any height within the slot. The second height adjusting means preferably comprises a plurality of mounting plates for supporting cross bars of the travelling frame, with each mounting plate having an elongated slot, and a plurality of sleeves connected to the mounting plates and supporting spreader supports on which the spreader bars are mounted, with each sleeve being movable within the limits of the elongated slots to various heights, and being securable to the mounting plate at any height within the slot.

Desirably, the drive means includes first reciprocating means connected to one side of the travelling frame and second reciprocating means connected to the other side of the travelling frame, to provide positive reciprocating force on each side of the travelling frame. A flexible blade is preferably mounted on the upper end of the travelling frame to distribute and force incoming scallop meats onto the rollers. The drive means is preferably provided with a reciprocating stroke that is sufficiently long to bring the lower spreader bar over the lowermost roller on its downstroke and the upper spreader bar over the uppermost roller on its upstroke.

It is to be understood that both the foregoing general description and the following detailed description are exemplary and explanatory but are not restrictive of the invention.

DETAILED DESCRIPTION OF THE INVENTION

The accompanying drawings, which are incorporated in and constitute a part of this invention, illustrate a preferred embodiment of the invention, and together with the description, serve to explain the principles of the invention.

Figure 1:
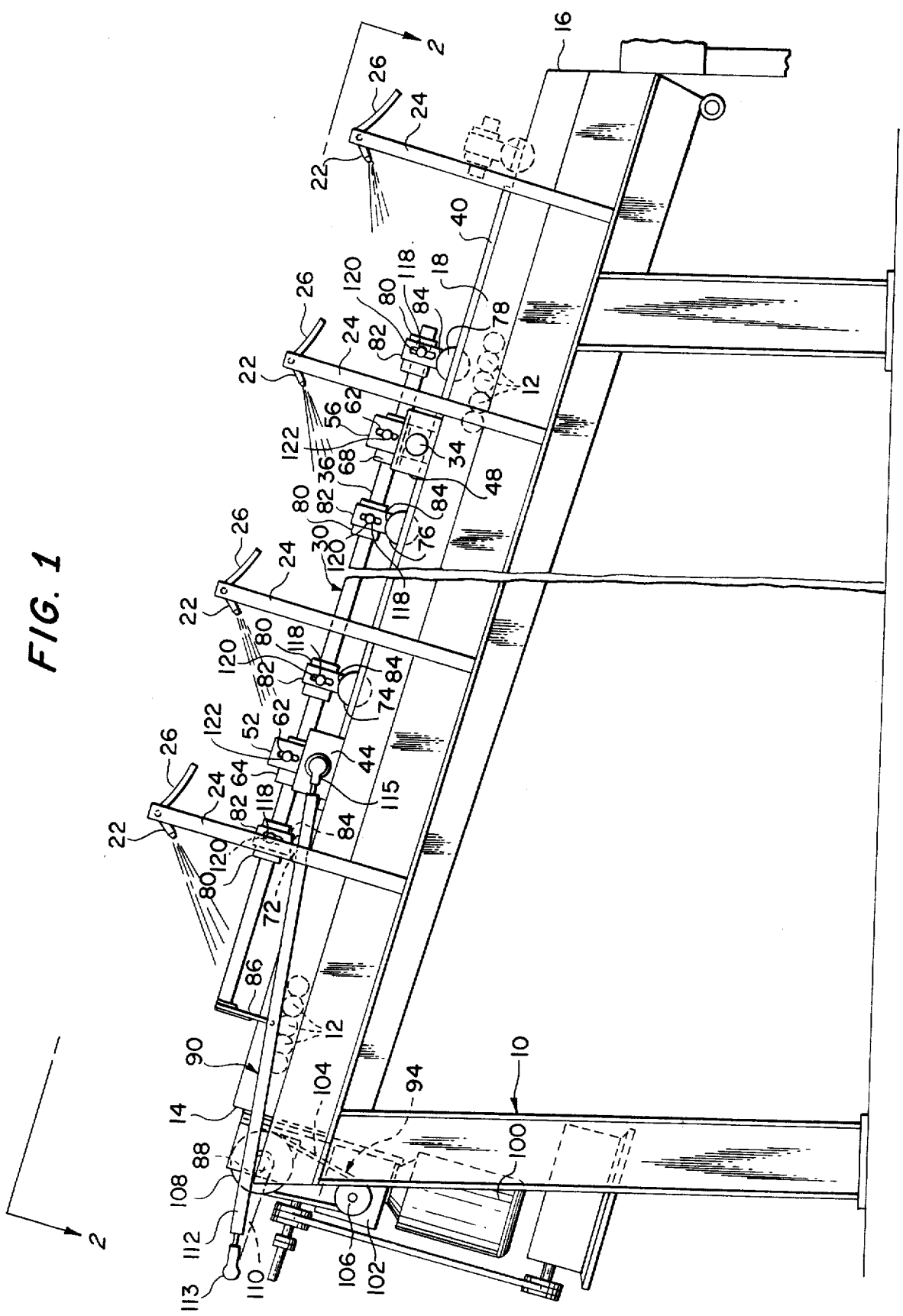
Figure 2:
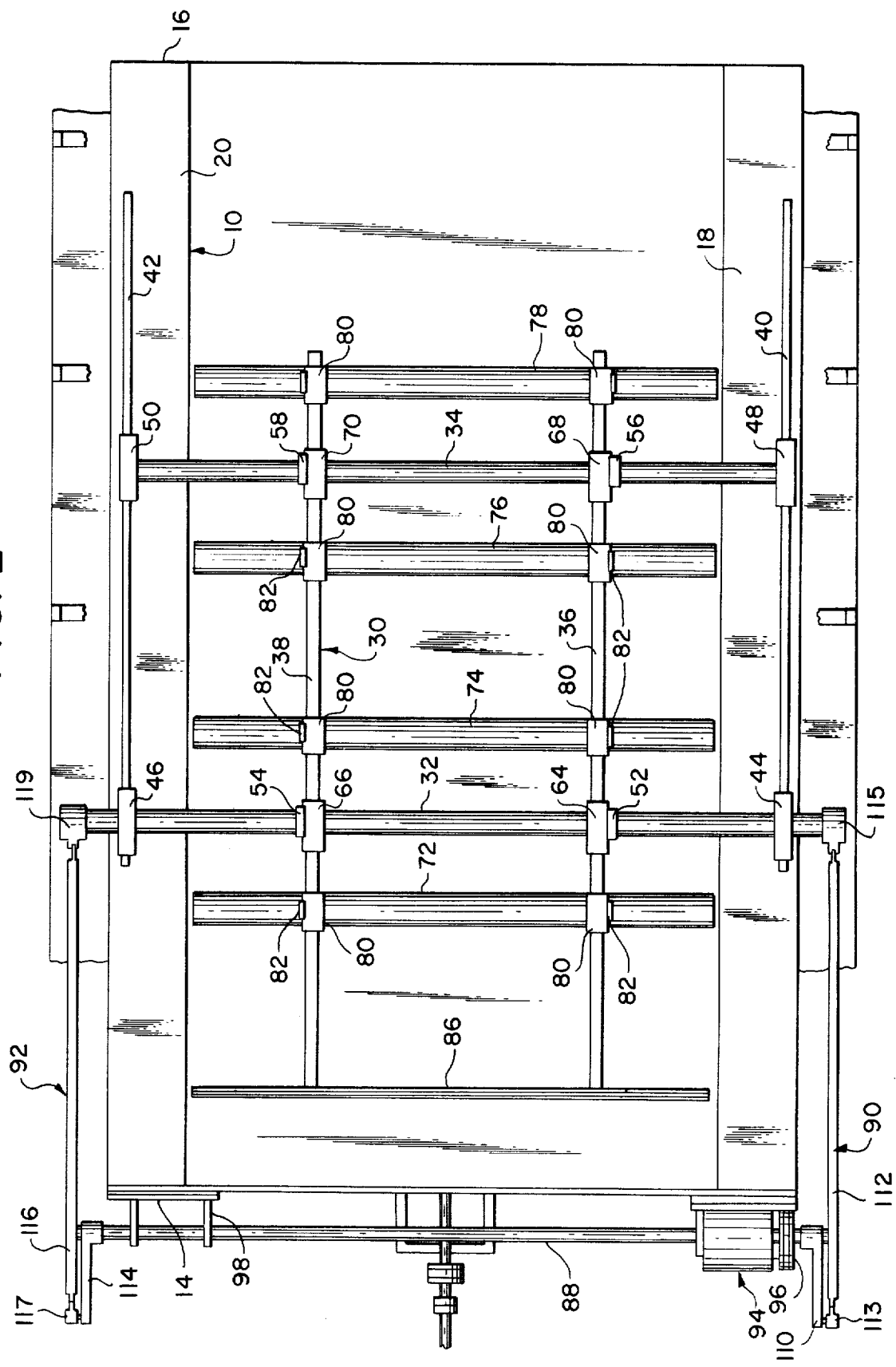

Of the drawings:

FIG. 1 is a schematic side elevation of an apparatus for extracting viscera from adductor muscles constructed in accordance with the invention; and FIG. 2 is a view of the apparatus of FIG. 1 taken along line 2—2 of FIG. 1.

The present device of extracting the viscera from adductor muscle is applicable to scallops generally, including sea scallops, *Placopecten magellanicus;* bay scallops, *Aequipecten irradians;* and Calico scallops, *Aequipecten gibbus.* While the different varieties vary in size, their similar physiology allows them to be processed by the device of the present invention. The device of the present invention, however, is especially useful in eviscerating sea scallops because of their large size and the problems usually associated with the variations in their size.

As used in the specification and claims, the term scallop "meat" refers collectively to the adductor muscle and viscera.

It is desirable that the scallop meats to be eviscerated by the process of the invention be free of shell fragments and sand because these materials would interfere with the process. Preferably, the shucking method described in the above referred to U.S. Pat. No. 3,665,555 is used although any suitable shucking method can be employed.

Referring to the drawings and as best seen in FIG. 1, the present invention is embodied in a scallop eviscerator having a main frame, generally 10, on which a plurality of rollers 12 are arranged to form a uniformly inclined path descending from an input end 14 of the eviscerator to an output end 16 of the eviscerator. It will be understood by those skilled in the art that rollers are provided along the entire length of frame 10, and only a small number of such rollers are shown in the drawing including a first group at the top or input end 14 of the eviscerator and a second group toward the output end 16. Each roller 12 has its axis aligned transversely of the inclined path and is positioned so that the surface of each intermediately positioned roller forms a nip with the adjacent roller on its input side and a nip with the adjacent roller on the output side. Drive means (not shown) are provided for oscillating the rollers so that the upper exposed portions of adjacent rollers are alternately rotated toward each other to pull viscera from the scallop muscles and through the nip of the rollers, and alternately rotated away from each other to permit the lower of the two rollers to advance the scallop down the inclined path.

Eviscerator frame 10 includes a first side frame member 18 and a second side frame member 20 as illustrated in FIG. 2. Each side frame member 18 and 20 extends the length of the eviscerator and rollers 12 are suitably journalled into the inner vertical sides of side frame members 18 and 20 below the top surface of the side frame members. The slope formed by the incline of the roller path from the horizontal is preferably 10° to 15°. The bank of rollers is uniformly inclined gradually from the input end 14 of the eviscerator to the discharge end 16 of the eviscerator. Preferably, the surfaces of the rollers do not touch, and are spaced apart far enough to permit their rotation without making frictional contact.

Spray means are positioned above the inclined path formed by rollers 12 for directing a fluid under pressure on the scallop meats positioned on the rollers. When the fluid is selected to be a liquid of low viscosity, such as water, the spray means provides a lubricating film on the surface of the rollers that permits the scallop muscles to freely rotate about their cylindrical axes while supported by the rollers, thus exposing the entire peripheral surface of the muscles to the pulling action of the nip formed by the rollers.

As best seen in FIG. 1, the spray means includes a plurality of spray nozzles 22 that are longitudinally spaced on frames 24 along the path. The spray nozzles are also laterally spaced across the path. Spray nozzles 22 are each provided with an inlet conduit 26 connected to a source of fluid under pressure, preferably water.

As illustrated in FIG. 1, the direction of the fluid issuing from spray nozzles 22 is inclined upwardly with relation to the path formed by the rollers, and tends to impede the movement of the muscles down the path. It is desirable that the spray means be so arranged that substantially the entire upper surface area of the rollers can be continuously sprayed with the fluid.

In accordance with the invention, a travelling frame is mounted on the eviscerator frame for reciprocating movement relative to the eviscerator frame and counterrotating rollers. As here embodied, the travelling frame, generally 30 comprises a plurality of cross bars, including a first cross bar 32 and a second cross bar 34, which are slidably mounted on and extend laterally across eviscerator frame 10 from first side frame member 18 to second side frame member 20 and a plurality of spreader supports in the form of bars including a first spreader support 36 and a second spreader support 38, which are connected to the cross bars and which extend longitudinally in the direction of the inclined path. A first longitudinally extending square guide track 40 is mounted on the top surface of first side frame member 18 and a second longitudinally extending square guide track 42 is mounted on the top surface of second side frame member 20 and is aligned with first guide track 40.

A plurality of slide blocks 44, 46, 48 and 50, one for each end of cross bars 32 and 34, are provided for supporting travelling frame 30 on eviscerator frame 10. The bottom surface of each slide block 44, 46, 48 and 50 has a longitudinally extending groove to enable each slide block to slide on its corresponding guide track 40 or guide track 42. As best seen in FIG. 2, first cross bar 32 is longer than second cross bar 34 so that the ends of first cross bar 32 extend through and substantially beyond its slide blocks 44 and 46 while the ends of second cross bar 34 are substantially flush with its slide blocks 48 and 50.

A plurality of mounting plates are secured to each cross bar 32 and 34. As best seen in FIG. 2, two mounting plates 52 and 54 are secured to cross bar 32 and two mounting plates 56 and 58 are secured to cross bar 34. Each mounting plate and its operation are substantially identical and therefore only mounting plate 56 will be described in detail. Mounting plate 56 is substantially rectangular in cross section and has a circular opening at its bottom end whose axis is parallel to the axis of cross bar 34 to enable the cross bar to pass through it. Cross bar 34 is secured to mounting plate 56 by conventional means such as by welding. Mounting plate 56 has an elongated slot 62 at its top (FIG. 1). The length of slot 62 extends substantially parallel to the vertical, but because eviscerator frame 10 and travelling frame 30 are at an incline of about 10° to 15° to the horizontal, the length of slot 62 is at a similar incline to the vertical. The two mounting plates 56 and 58 for cross bar 34 are equally spaced from the ends of the cross bar and overlie rollers 12. Mounting plates 56 and 58 for cross bar 34 are longitudinally aligned with mounting plates 52 and 54 for cross bar 32.

Each mounting plate 52, 54, 56 and 58 has a sleeve 64, 66, 68 and 70, respectively, mounted to its inner side, and as explained in greater detail hereafter, each sleeve is vertically movable relative to the mounting plate. Each sleeve 64, 66, 68 and 70 has a circular opening whose axis is substantially perpendicular to the axis of cross bars 32 and 34 to enable spreader supports 36 and 38 to pass through and be supported. Spreader supports 36 and 38 are secured to their respective sleeves by conventional means such as by welding.

In accordance with the invention, a plurality of spaced spreader bars are mounted on the travelling frame with the axes of these spreader bars being substantially parallel to the axes of the rollers. As here embodied, four spreader bars 72, 74, 76 and 78, are spaced along a portion of the length of the eviscerator. Each spreader bar 72, 74, 76 and 78 is connected to and supported by spreader supports 36 and 38, with one end of each spreader bar being supported by spreader support 36, and the other end being supported by spreader support 38. Each spreader support 36 and 38 has four sleeves 80, one for each spreader bar 72, 74, 76 and 78. Each sleeve 80 has a circular opening whose axis is parallel to the axis of the spreader support to enable the spreader support to pass through it. Each sleeve 80 is secured to its spreader support by conventional means as by welding. The four sleeves 80 on spreader support 36 are evenly spaced from each other and are laterally aligned with the four sleeves 80 or spreader support 38.

A bracket 82, as explained in greater detail hereafter, is adjustably secured to the outer surface of each sleeve 80. The lower end of each bracket 82, as best seen in FIG. 1, has a concave surface 84 shaped to conform to the outer surface of a spreader bar so that each spreader bar can be secured thereto. The spreader bars are secured to the concave surface of brackets 82 by conventional means as by welding.

The lower portion of the wall surface of each spreader bar 72, 74, 76 and 78 is preferably covered with an exterior layer of a protuberated non-slip surface such as that sold by Minnesota Mining and Manufacturing under the trademark "Scotch-Lag." The exterior non-slip layer preferably includes cork or rubber particles that form the protuberances, which are bonded together by a continuous phase of rubber-base adhesive. Protuberances formed by the cork or rubber particles are not easily loosened or removed from the surface of the spreader bars, and they do not swell or change in volume upon continued exposure to water.

The continuous phase of the exterior non-slip layer of each spreader bar 72, 74, 76 and 78 is formed of a rubber-based or rubbery adhesive composition which is cured to a tough, non-brittle, wear-resistant state. At least one third of the total weight of the solids material of the continuous phase, exclusive of inorganic fillers, is rubber material. A variety of curable rubber-based adhesive compositions may be used as the continuous phase including synthetic elastomeric materials and natural rubbers or blends.

The protuberated non-slip nature of spreader bars 72, 74, 76 and 78 provides a good gripping surface for engaging the scallop meats and pushing them in a desired direction of movement. The non-slip outer layer may be adhered or bonded to the surface of the spreader bars by a variety of adhesive material.

Each spreader bar is preferably about three inches in diameter and made of a suitable material such as stainless steel. Although spreader bars 72, 74, 76 and 78 are here shown as being tubular in shape, it will be understood by those skilled in the art that the spreader bars can have other shapes. For example, the spreader bars can be in the form of flat blades made from stainless steel.

Preferably, a flexible blade 86 is mounted to spreader supports 36 and 38 at the top of travelling frame 30 and extends downwardly toward rollers 12. Blade 86 can be made of neoprene rubber or any other suitable elastomer. Blade 86 engages scallop meats as they enter the inlet end of the eviscerator and distributes and forces them onto rollers 12. Once the scallop meats reach rollers 12, the rotating action of the rollers moves them down the inclined roller path.

In accordance with the invention, drive means are connected to the travelling frame for reciprocating the travelling frame in a plane aligned with the inclined path. As here embodied, and as best seen in FIG. 2, the drive means includes a shaft 88 which extends laterally across the eviscerator frame, a first reciprocating means generally 90 which connects the shaft 88 with one side of the travelling frame 30, a second reciprocating means generally 92 which connects shaft 88 with the other side of travelling frame 30 and a chain drive system generally 94 for rotating the shaft 88. Shaft 88 extends laterally across the eviscerator frame 10 and has one end journalled in a support 96 secured to side frame member 18 and its other end journalled in a support 98 secured to side frame member 20.

Chain drive system 94, as best seen in FIG. 1, includes a drive motor 100 which is secured to the upper end of eviscerator 10 adjacent side frame member 18, a speed reducer 102 positioned above and connected to motor 100, and a drive chain 104. Speed reducer 102 has a sprocket 106 and the lower end of drive chain 104 is mounted about this sprocket. The upper end of drive chain 104 is mounted about a sprocket 108 which is fixed to shaft 88.

First reciprocating means 90 is connected to the end of shaft 88 adjacent side frame member 18 and includes a crank 110 which is fixed to the outer end of shaft 88 and a connecting rod 112 which is joined to the outer end of crank 110 by a link 113 which is fixed to the connecting rod and pivotally mounted on the end of crank 110. The other end of connecting rod 112 is connected to guide block 44 by a link 115 which is fixed to the connecting rod and pivotally mounted on the end of cross bar 32. Shaft 88 continuously rotates crank 110 in a single direction and this rotary motion is transformed into a reciprocating motion through links 113 and 115 and connecting rod 112. Second reciprocating means 92, as seen in FIG. 2, is connected to the end of shaft 88 adjacent side frame member 20 and includes a crank 114 whose inner end is fixed to the outer end of shaft 88 adjacent side frame member 20 and a connecting rod 116 which is joined to the outer end of crank 114 by a link 117. Link 117 is fixed to connecting rod 116 and pivotally mounted on the end of crank 114. The other end of connecting rod 116 is connected to guide block 46 by a link 119 which is fixed to the connecting rod and pivotally mounted on the end of cross bar 32. Shaft 88 continuously rotates crank 114 in the same direction as crank 110 and this rotary motion is transformed into a reciprocating motion through links 117 and 119 and connecting rod 116.

In accordance with the invention, adjustment means are connected to the travelling frame for varying the height of the spreader bars above the eviscerator rollers. As here embodied, the adjustment means comprises first adjusting means connecting each spreader bar with the travelling frame for individually adjusting the height of each spreader bar and second adjusting means connected to the travelling frame for adjusting the height of the travelling frame.

The first height adjusting means for each spreader bar includes the two brackets 82 to which the spreader bar is secured. Each bracket 82 has an elongated slot 118 and is movable within the limits of the elongated slot to various heights. A screw 120 is provided for each bracket 82 as a means for securing each bracket to its sleeve 80 and thus to travelling frame 30 at any height within the slot. Each sleeve 80 has a threaded hole to receive a screw 120. When screw 120 is loosened, bracket 82 can be moved to any height within the limits of slot 118 and can then be secured to sleeve 80 by tightening the screw. The length of slot 118 extends substantially parallel to the vertical, but because eviscerator frame 10 and travelling frame 30 are at an incline of about 10° to 15° to the horizontal, the length of slot 118 is at a similar incline to the vertical.

The second adjusting means for adjusting the height of the travelling frame includes the two mounting plates that support each cross bar of travelling frame 30, that is, mounting plates 52 and 54 for cross bar 32 and mounting plates 56 and 58 for cross bar 34. As described above, each mounting plate has an elongated slot 62. Sleeves 64, 66, 68 and 70 are adjustably secured to their respective mounting plates 52, 54, 56 and 58 by means of a screw 122 which passes through elongated slot 62 and into a threaded opening in the sleeve. When screws 122 are loosened, each sleeve 64, 66, 68 and 70 can be moved to a desired height within the limits of slot 62 and can then be secured to its mounting plate by tightening of the screw.

In operation, scallop meats are placed on the upper surface of the inclined path formed by the plurality of rollers 12 having their axes transverse of the path. The initial orientation of scallop muscles on the path is immaterial, as the cylindrical adductor muscle is soon oriented by rollers 12 so that the axis of the muscle is generally parallel to the rollers. In this position, the muscle rotates about its axis, generally in the direction of the rotation of the lower of two adjacent rollers 12 forming a nip, and exposes the viscera around substantially its entire periphery to the nip formed by each pair of adjacent rollers. The viscera is pulled from the muscle and through the nip formed by adjacent rollers by rotating the upper portion of adjacent rollers towards each other. The rollers exert a frictional pulling force on the viscera in a downward direction through the nip of the rollers while at the same time restraining movement of the scallop muscle in that direction.

The rollers are oscillated (counter rotated) so that they alternate between pulling viscera from the muscle and advancing the muscles down the path. The degree of rotation of the upper portion of the rollers towards each other is preferably at least 360° for rollers at the top of the path, but the degree of rotation of rollers located lower in the path can be reduced below 360°.

During rotation of rollers 12, travelling frame 30 reciprocates over the bank of rollers 12 in a plane parallel to the inclined path. Drive motor 100 rotates endless drive chain 104 continuously in a single direction causing sprocket 108 to be similarly rotated. Sprocket 108, being fixed to shaft 88, in turn, causes the shaft to continuously rotate in a single direction. Rotation of shaft 88 brings about a unidirectional rotation of cranks 110 and 114 which is transformed into a reciprocating motion to travelling frame 30 through the linkages of connecting rods 112 and 116.

The reciprocating stroke of connecting rods 112 and 116 is sufficiently long to bring the lowermost spreader bar 72 over the lowermost roller 12 on its downstroke and the uppermost spreader bar 78 over the uppermost roller 12 on its upstroke.

Spreaders bars 72, 74, 76 and 78 tend to move scallop meats back up the inclined path of rollers 12 during the upstroke of travelling frame 30. The length of time that the scallop meats are subjected to the action of the eviscerator rollers 12 is thus increased and the scallop meats are thereby subjected to a repeated eviscerating action by rollers 12 before they leave the eviscerator.

Spreader bars 72, 74, 76 and 78 further aid in removing viscera from the scallop meats by exerting a turning force on the scallop meats and thereby insure that the viscera are brought to a position just above the nip formed by a pair of adjacent rollers 12 where the viscera can be pulled from the muscle. The spreader bars also tend to force larger size scallops into the nip of adjacent rollers 12.

The height of the spreader bars can be adjusted to meet any processing condition that may arise and enables the eviscerator to function in an efficient manner when processing scallops of various sizes. Ordinarily, the spreaders bars are adjusted so that the clearance between the bottom of the spreader bars and the top of the eviscerator rollers is slightly less than the diameter of the scallops being processed.

The spreading device of this invention thus helps to feed scallop viscera into the nips formed by the rollers, aids in distributing the scallops transversely of the inclined path, and provides a means for moving scallop meats back up the inclined roller path to increase the number of times a scallop muscle is subjected to a given nip formed by a pair of rollers. All these functions tend to permit using a smaller eviscerator formed by a smaller number overall rollers. The invention thus can provide a more compact overal eviscerator.

The invention in its broader aspects is not limited to the specific details shown and described and departures may be made from such details without departing from the principles of the invention and without sacrificing its chief advantages.

What is claimed is:

1. A scallop spreading device for use with a scallop eviscerator formed by a plurality of counter-rotating rollers rotatably mounted on a frame to form an inclined path, with the axes of the rollers aligned transversely of the path, said spreading device comprising:
   a. a travelling frame mounted on the eviscerator frame for reciprocating movement relative to the eviscerator frame and the counter-rotating rollers;
   b. a plurality of spaced spreader bars mounted on said travelling frame with the axes of said spreader bars being substantially parallel to the axes of the rollers and the clearance between the bottom of the spreader bars and the top of the rollers being slightly less than the diameter of the scallops being processed;
   c. drive means connected to said travelling frame for imparting reciprocating movement to said travelling frame in a plane aligned with the inclined path, the downstroke of said reciprocating movement moving said travelling frame in the direction toward the lowermost roller of said eviscerator, and the upstroke of said reciprocating movement moving said travelling frame in the direction toward the uppermost roller of said eviscerator; and
   d. adjustment means connected to said travelling frame for varying the height of said spreader bars above the eviscerator rollers, said adjustment means including first height adjusting means connecting each spreader bar with said travelling frame for individually adjusting the height of each spreader bar, said first height adjusting means for each spreader bar comprising a plurality of brackets to which the spreader bar is secured, each bracket having an elongated slot and being movable within the limits of the elongated slot to various heights, and means for securing the bracket to the travelling frame at any height within the slot.

2. The device of claim 1 wherein said adjustment means includes second adjusting means connected to the travelling frame for adjusting the height of said travelling frame.

3. The device of claim 2 wherein said second height adjusting means comprises a plurality of mounting plates for supporting cross bars of the travelling frame, with each mounting plate having an elongated slot, and a plurality of sleeves, one for each mounting plate, connected to the mounting plates and supporting spreader supports on which the spreader bars are mounted, with each sleeve being movable within the limits of the elongated slot to various heights and being securable to the mounting plate at any height with the slot.

4. The device of claim 1 wherein said travelling frame comprises a plurality of cross bars slidably mounted on said frame with their axes substantially parallel to the spreader bars and a plurality of spreader supports extending longitudinally in the direction of the inclined path.

5. The device of claim 1 wherein said drive means includes first reciprocating means connected to one side of the travelling frame and second reciprocating means connected to the other side of the travelling frame, to provide positive reciprocating force on each side of the travelling frame.

6. The device of claim 5 wherein said drive means includes a shaft extending laterally across the eviscerator frame, said first reciprocating means is connected with one end of said shaft and said second reciprocating means is connected with the other end of said shaft.

7. The device of claim 6 wherein said first and second reciprocating means each includes a crank connected to the shaft and a connecting rod joining said crank with a side of the travelling frame, and a chain drive system is connected to said shaft to rotate it and power the first and second reciprocating means.

8. The device of claim 1 including a flexible blade mounted on the upper end of the travelling frame to distribute the force incoming scallop meats onto the rollers.

9. The device of claim 1 wherein said drive means has a reciprocating stroke that is sufficiently long to bring the lowermost spreader bar over the lowermost roller on its downstroke and the uppermost spreader bar over the uppermost roller on its upstroke.

* * * * *

UNITED STATES PATENT OFFICE
CERTIFICATE OF CORRECTION

Patent No. 3,945,084            Dated March 26, 1976

Inventor(s) Elmer D. Willis

It is certified that error appears in the above-identified patent and that said Letters Patent are hereby corrected as shown below:

Claim 8, column 10, line 3, after the word "distribute" delete "the" and insert therefor --and--.

Signed and Sealed this fifteenth Day of June 1976

[SEAL]

Attest:

RUTH C. MASON
Attesting Officer

C. MARSHALL DANN
Commissioner of Patents and Trademarks